Oct. 28, 1958  J. L. GERTZ  2,858,413
SPOT WELDING DEVICE FOR MECHANICAL FILTERS
Filed May 7, 1956  4 Sheets-Sheet 1

INVENTOR.
JOSEPH L. GERTZ
BY
ATTORNEYS

Oct. 28, 1958  J. L. GERTZ  2,858,413
SPOT WELDING DEVICE FOR MECHANICAL FILTERS
Filed May 7, 1956  4 Sheets-Sheet 2

INVENTOR.
JOSEPH L. GERTZ
BY Moody and Harsha

ATTORNEYS

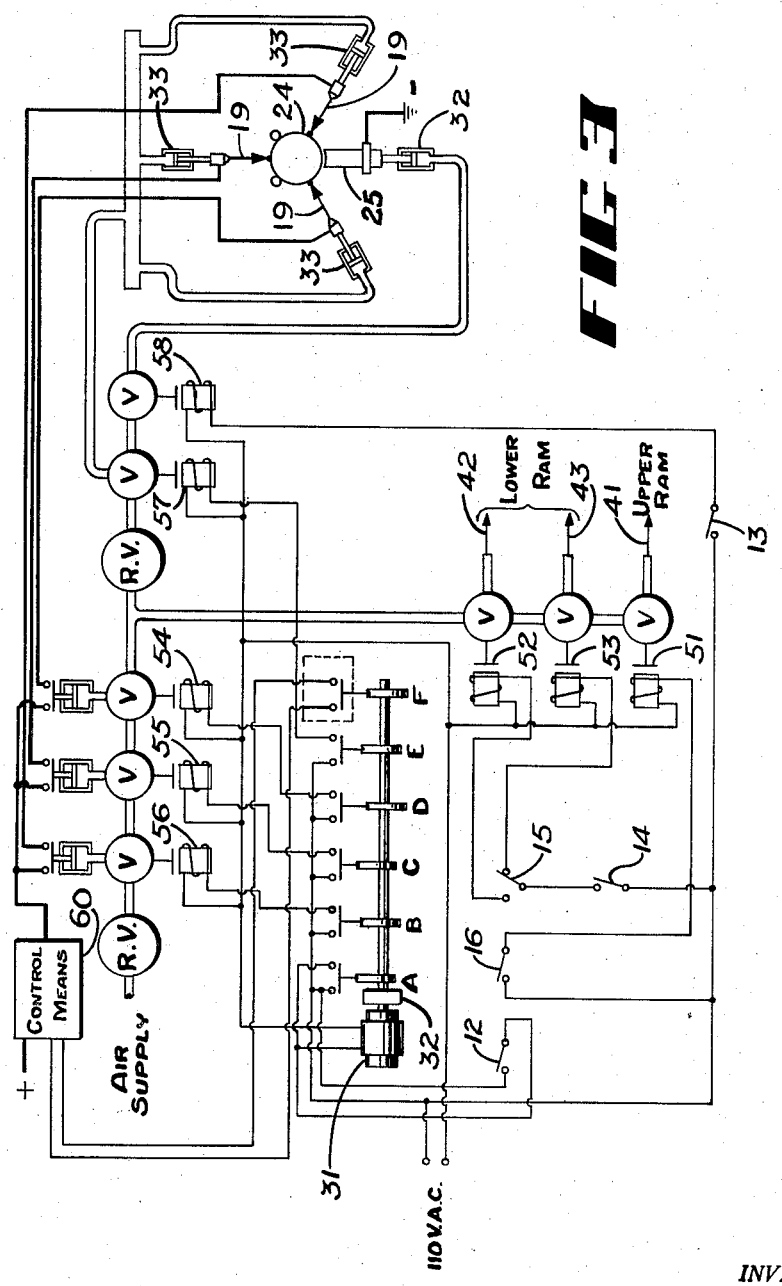

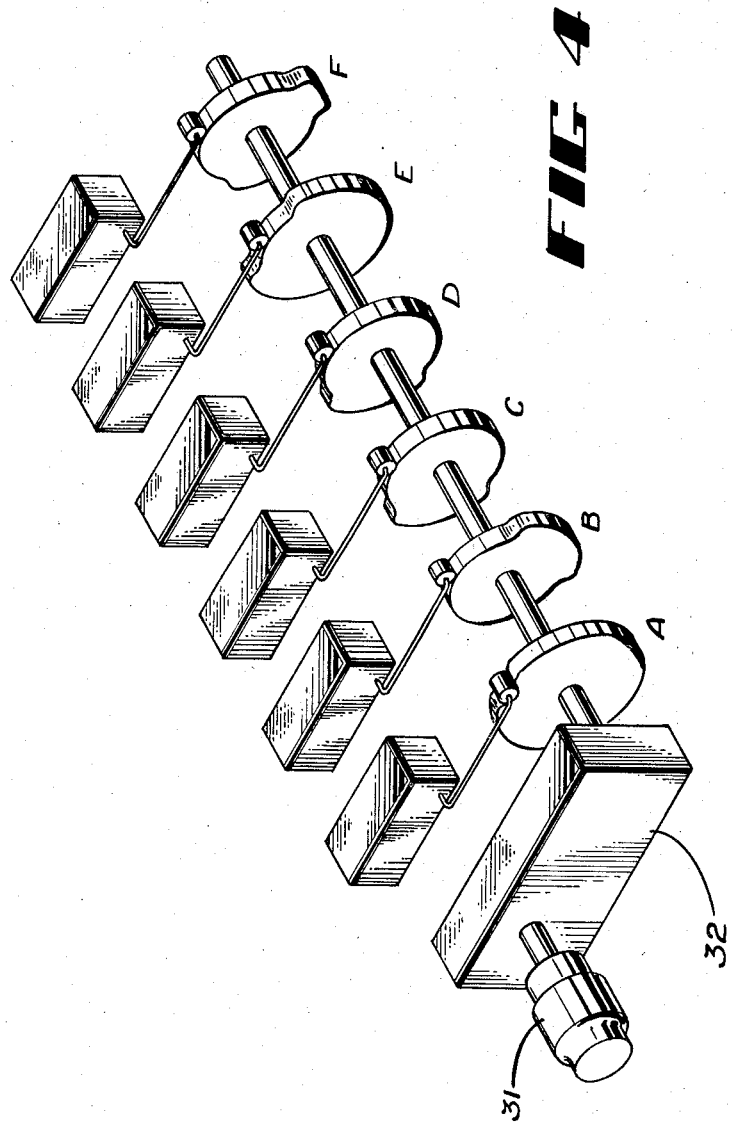

United States Patent Office 2,858,413
Patented Oct. 28, 1958

2,858,413

SPOT WELDING DEVICE FOR MECHANICAL FILTERS

Joseph L. Gertz, La Crescenta, Calif., assignor to Collins Radio Company, Cedar Rapids, Iowa, a corporation of Iowa Application May 7, 1956, Serial No. 583,254

6 Claims. (Cl. 219—80)

This invention relates to a spot-welding device for semi-automatically assembling a mechanical filter by positioning the discs of the filter so as to be automatically welded. More particularly it relates to a spot-welding device or machine which automatically positions the discs and the coupling wires of a mechanical filter with great accuracy and automatically welds the coupling wires to the discs.

Mechanical filters have better operating characteristics when the discs are at a fixed distance from each other. At the present time mechanical filters are almost completely assembled by hand. During this hand assembling, the space between the discs of the filter is ascertained by the use of pre-cut spacers. These spacers when aligned by hand may or may not be accurately aligned. Furthermore, the spacers are usually unprotected and thus subjected to wear and possible deformation, so that the spacers themselves may not retain their original dimensions. If the spacers are inaccurate or misaligned, correct assembly of the mechanical filter is not possible. The filter will work if it is not accurately assembled; however, the operating characteristics of the mechanical filter will not be of the desired or optimum values.

This invention contemplates the provision of semi-automatic assembling means which will accurately maintain the spacing between the discs of the mechanical filter. This invention provides for the accurate spacing between the discs by the use of a plurality of pre-set gauge blocks which are enclosed and protected in this invention so that the accuracy of the spacing blocks is assured. This invention further provides that the coupling wires are accurately aligned in circumferential relationship to the disc. This alignment of the wires and discs is maintained during the entire cycle of the fabrication of the mechanical filter. The present invention further provides an automatic welding cycle which welds the coupling wires to the discs of the mechanical filter in a predetermined sequence and with an accurate control over the weld so that a desired weld is created. This invention also provides means for continuously maintaining an accurate alignment between the discs and between the discs and the coupling wires.

This invention includes provisions for placing by hand a plurality of discs individually in the machine. The discs are then delivered by the machine to a suitable position for automatic operation. The pre-set gauge blocks which control the positioning of the discs for the welding operations are selected as to sequential value by the operator. This selection corresponds to the correct distance or spacing between each of the discs of the mechanical filter. A switch is provided for controlling the automatic welding of the coupling wires to the discs. This switch controls a motor which operates a set of cams for opening and closing the welding circuits in a predetermined sequence.

A feature of this invention is that it provides a semi-automatic assembling machine which positions and retains the coupling wires and discs of a mechanical filter in perfect alignment throughout an entire assembly operation. It is a further feature of this invention that the coupling wires and discs of a mechanical filter are accurately welded in a predetermined position.

It is an object of this invention to provide a semi-automatic machine which will accurately and rapidly assemble mechanical filters. It is another object of this invention to provide a machine which accurately positions the coupling wires of a mechanical filter to be welded to the discs of the filter. It is still another object of this invention to provide a machine which will weld each of the coupling wires in a prescribed sequence to each individual disc of the mechanical filter. It is a further object of this invention to provide a semi-automatic machine for assembling of mechanical filters which will materially decrease the cost of assembling each filter, at the same time increasing the accuracy and reliability of each filter.

These and other objects of this invention will become apparent when the following description is read in conjunction with the accompanying drawings, in which Figure 1 is a perspective view of this invention;

Figure 3 is a schematic view of the air pressure and electrical control system associated with this invention; and Figure 4 is a detailed perspective view of the cam system which controls the sequential firing of the welding mechanism of this invention.

Figure 1:
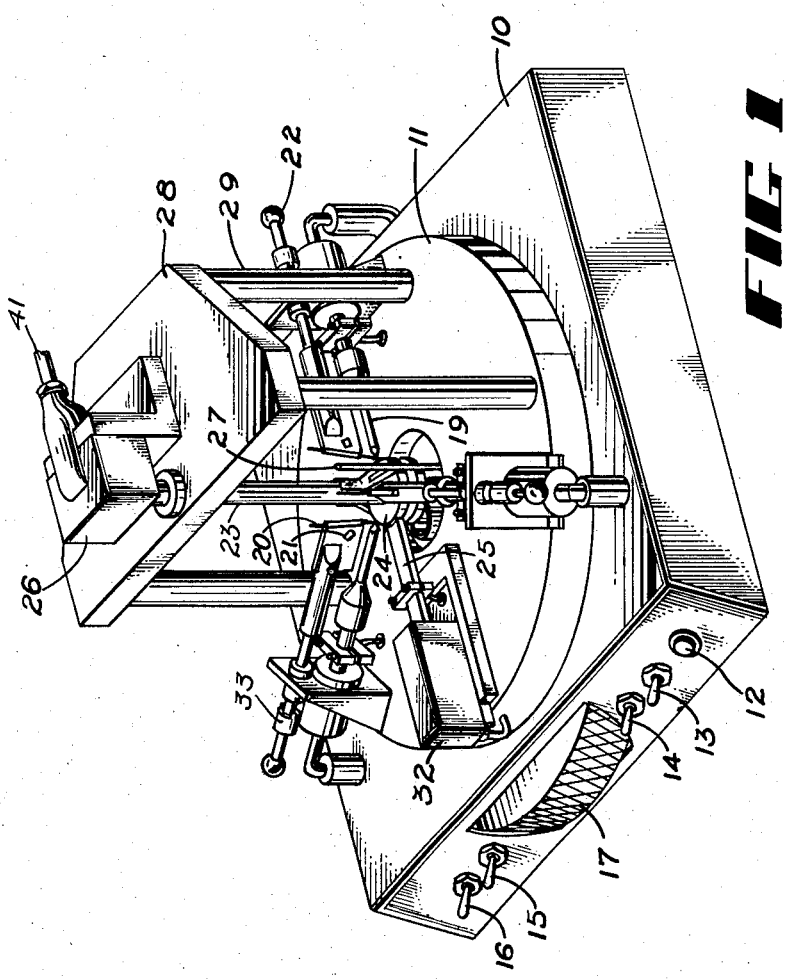
Figure 2:
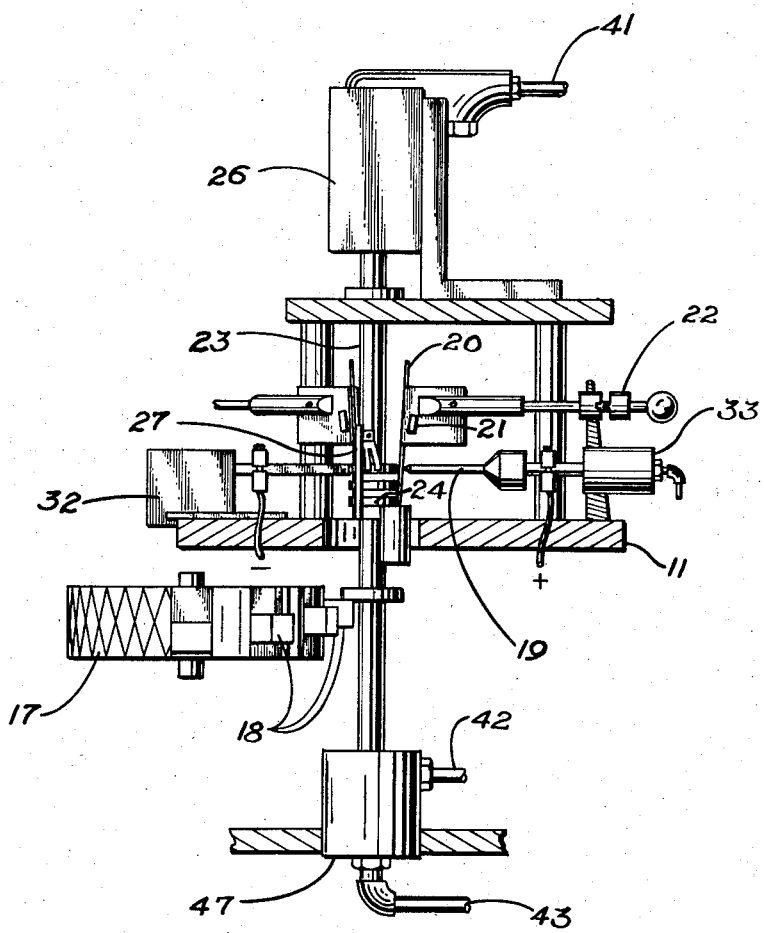
Figure 2 is a sectional view of a portion of this invention showing the positioning mechanisms and the welding mechanisms in detail.

With more particular reference to the drawings, and especially to Figures 1 and 2, this invention includes a base 10, normally made of metal or other durable material. Mounted on top of base 10 is a support 11 which includes most of the visible operating portions of this invention. On the front of the base 10 are five switches, 12, 13, 14, 15, and 16. Also protruding from the face of the base 10 is a knurled dial 17. There is a platform 28 which is supported by the support 11 and a number of posts 29. The valves controlling the upper ram 23 are located on platform 28. Platform 28 is elevated above support 11 a distance sufficient to give the upper ram operating room.

The knurled dial 17 is to be rotated by the operator so as to space the discs of the mechanical filter. This knurled dial has a plurality of spacing discs 18 affixed to the disc opposite from the knurled side.

The five switches on the front of the base 10 are used in controlling the air pressure, the motor for controlling the welding operations, and the movements of the electrodes. These control functions will be described in more detail when the operational description of the machine is presented. There are three positive welding electrodes 19 which perform the welding operations on the coupling wires 20 and the discs 24. These electrodes 19 are controlled by air pressure on valves which are responsive to signals from the plurality of cams in a control mechanism. The coupling wires 20 are held in a fixed position by magnetic holders 21. These magnetic holders are controlled as to their position by the use of control arms 22. Control arms 22 may be operated so as to move the holders to accommodate discs of varying diameter.

The upper ram 23 is controlled by the operation of a switch which regulates the air pressure in the cylinder 26. The upper ram is so designed that it will hold and align both discs and disc tubes. Disc tubes are the end pieces of a mechanical filter and are usually elongated discs. The upper ram also automatically descends a fixed distance each and every time it is operated. The disc in the upper ram is controlled as to its position by the lower ram. The movement of the lower ram is controlled by the dial 17 rotating the spacers 18. The filter as it is assembled is thus moved downward relative to the earth's surface as each disc is added.

The operation of this machine is thus dependent upon the proper spacing between the discs and the proper welding operations of the coupling wires to the discs. The spacing of the discs from each other is controlled by the accuracy of the spacers integral to dial 17. Each disc is placed in the upper ram and the upper ram in cooperative relation with the lower ram positions each disc for welding. The welding position is determined by the movement of the lower ram inasmuch as the upper ram is fixed in its vertical travel.

The positioning electrode or negative electrode 25 is forced against each disc as it is lowered by the upper ram. Electrode 25 thus exerts a pressure against the disc and the guide posts 27. When the disc is firmly held by this pressure, the upper ram is removed and returns to its normal position. When the upper ram no longer is in contact with the disc, the welding cycle is begun. The welding cycle is controlled by switch 12 which controls the motor 31. As motor 31 rotates, a series of cams A through F, as shown in Figure 4, are rotated. Each cam has a single detent lifting device associated therewith. These cams have contours which are cut so that as the shaft rotates, the entire welding cycle is completed. The first step in an operational description of this invention is the turning on of switch 14. This operates relay 53 which controls the valve and the supply of air pressure in line 43. The switch 15 must be in the position as shown in Figure 3 when switch 14 is thrown. This causes the lower ram to raise to its maximum height. Now switch 14 is turned off. The air pressure is removed from the lower ram and cylinder 47 is connected by line 43 to the air supply. However, sufficient pressure remains to retain the lower ram in a maximum vertical position. The operator then places a disc tube on the lower ram at its maximum vertical height. The operator then turns the dial 17 to its No. 1 position. This places a spacing block of predetermined and accurate height under the shoulder of the lower ram. Switch 15 is now moved to its other position than that shown in Figure 3. Switch 14 is once again closed and relay 52 operates and causes the associated valve to open. This places an air pressure on the lower ram such as to force it downward and into a snug fit against the spacing block. When the shoulder of the lower ram is fit snugly against the No. 1 spacing block, the disc tube of the mechanical filter will be in its proper position for being welded to the coupling wires. The operator now places the coupling wires 20 in position in the magnetic holders 21. These magnetic holders are accurately positioned around the periphery of the mechanical filter so that the spacing between each of the wires is accurately determined. Having placed the coupling wires in position, the operator turns switch 13 to its "on" position. As seen in Figure 3, the closing of switch 13 operates relay 58 and the valve associated therewith. Operation of relay 58 and the valve associated therewith will allow air pressure to be applied to control arms 22 and thus position the electrode 25 against the disc tube. The pressure of the negative electrode against the disc tube is transmitted by the disc tube to the posts 27. The disc tube is then held firmly between the negative electrode and the posts. The operator now turns switch 12 to its "on" position. This applies power to motor 31 and starts the motor running. Operation of the motor 31 rotates the cams A through F as seen in Figures 3 and 4. Motor 31 rotates the cams through gear box 32.

The operation of this plurality of cams will now be described and the contours as shown in Figure 4 are necessary to give the following operation: First the A cam will lift and close the contacts associated therewith. This allows the motor 31 to continue to operate even if the firing cycle switch 12 is now released. Next, the E cam will lift and close the contacts associated therewith, which operates the relay 57 and the valve associated therewith. The opening of the valve associated with relay 57 applies air pressure to the plungers 33 and positions the positive welding electrodes against the coupling wires. B cam will now lift and this causes the relay 56 and the valve associated therewith to operate. The opening of the valve associated with relay 56 applies air pressure to the plunger and closes the contact from the positive welding current source and the first of the positive electrodes. Now the F cam lifts and applies positive welding current at the direction of the control means 60 to the first of the positive electrodes. B cam now falls and opens the circuit to the first of the positive electrodes, thereby ending the welding operation of that electrode. C cam now lifts and operates relay 55 and the valve associated therewith. The opening of the valve associated with relay 55 applies air pressure to the plunger associated with it and forms a closed circuit for the second positive electrode. The F cam again lifts and applies positive welding current as described above to the second positive electrode. The C cam then falls and opens the circuit to the second positive electrode, thereby ending the welding operations. The D cam then lifts, closing the contacts associated therewith and operating relay 54 and the valve associated therewith. The opening of the valve associated with relay 54 applies air pressure to a plunger which closes the circuit for the third positive electrode. The F cam again lifts and through the control means applies positive welding current to the third positive electrode. The F cam falls and the welding operation is ended. The E cam now falls and opens the circuit to relay 57, thereby removing air pressure from the positive electrodes and they are removed from their welding position. The A cam now falls and opens the motor circuit, stopping the motor.

The operator, upon completion of this welding cycle, turns off switches 13 and 14 and thereby opens the circuit to relays 58 and 52 and removes the air pressure from the lower ram and the negative electrode valve. This removes the negative electrode from contact with the disc and permits the lower ram to be lowered by turning the dial 17 to its No. 2 position. When the dial 17 is turned to its No. 2 position, the next lower spacing block is spaced under the shoulder of the spacing block. Then the switch 14 is closed and the lower ram once again is forced against the spacing block. The operator then places a disc in the upper ram and closes switch 16. Switch 16 operates relay 51 and the valve associated therewith. This applies air pressure through lead 41 to the upper ram and forces it to its lower operating position. This then places the disc as held by the upper ram in correct welding position with relation to the disc tube previously welded. The steps of the system commencing with the impressing of the negative electrode 25 against the disc is then repeated as described above. Any desired number of discs may be positioned by this machine, using the above-described technique, and each disc will be correctly positioned and permanently affixed to coupling wires to form an accurate mechanical filter.

Although this invention has been described with respect to a particular embodiment thereof, it is not to be so limited as changes and modifications may be made therein which are within the full intended scope of the invention as defined by the appended claims.

1. A machine for semi-automatically assembling filters including means for accurately positioning a plurality of connecting wires to form a cylinder, means for accurately positioning a plurality of discs within the cylinder formed by said wires, means for retaining said discs against a plurality of guideposts, means for simultaneously removing the means for positioning said discs, and a source of welding current, means for applying said welding current to said wires and said discs and a timing mechanism for sequentially welding said wires individually to said discs.

2. A machine for semi-automatically assembling mechanical filters including means for individually positioning the discs of said filter, means for locating the connecting wires of said filter around the circumference of said discs, means for sequentially controlling the position of an individual disc with respect to the prior discs in said filter, a negative electrode, said negative electrode holding said individual disc against a plurality of guideposts, a plurality of positive electrodes located opposite the connecting wires on the circumference of said filter, means for positioning said positive electrodes against said connecting wires, a source of welding current, and a control mechanism for controlling the application of said positive welding current to said positive electrodes whereby the individual disc is sequentially welded to each of the connecting wires.

3. A machine for semi-automatically assembling mechanical filters including means for locating a plurality of connecting wires in a predetermined position on the circumference of a circle, means for receiving an individual disc, ram means for positioning said individual disc, means for changing the position of assembled discs with respect to said positioning ram, means for welding said connecting wires to said discs, including a negative electrode operable to firmly fix the position of the individual disc against a plurality of fixed guideposts, said means for receiving the individual disc removed from the individual disc when said negative electrode is operated, a plurality of positive electrodes, means for positioning said positive electrodes against said connecting wires, a source of welding current, said source of welding current connected to said positive electrodes, and means for controlling the application of said welding current to said electrodes whereby the connecting wires are sequentially welded to said discs.

4. A machine for semi-automatically assembling accurate mechanical filters including a means for receiving each individual disc, a first ram means, a second ram means, said second ram means variable with respect to the distance to said first ram means, said first ram means moving to a fixed position in operation, means for holding an individual disc, said means forming a part of said first ram means, a plurality of connecting wires located about the circumference of said disc, said first ram means positioning an individual disc with relation to said second ram means, a negative electrode, a plurality of fixed guideposts, the negative electrode firmly fixing each individual disc against said guideposts, means for removing said first ram means when said negative electrode fixes said disc, a plurality of positive electrodes, said positive electrodes positioned against said connecting wires, a source of positive welding current, means for applying said welding current to said positive electrodes, and means controlling the application of said welding current to said positive electrodes whereby the connecting wires are sequentially welded to each individual disc.

5. A machine for semi-automatically assembling mechanical filters, the mechanical filters comprising a plurality of connecting wires and a plurality of discs, said machine including means for grasping an individual disc, said grasping means being a portion of a first ram means, said first ram means moving said disc to a predetermined location in space, a second ram means, the first disc in each filter being positioned against said second ram means, said second ram means being movable axially with respect to said first ram means and said discs whereby the actual distance relationship between discs is controlled, means for positioning a plurality of connecting wires on the circumference of said discs, means for welding said wires to said discs including a negative electrode and a plurality of positive electrodes having a positive welding current sequentially applied thereto.

6. A semi-automatic machine for assembling mechanical filters including means for positioning each of the individual discs comprising the mechanical filters to an exact spatial position, means for changing the spatial relationship between each individual disc parallel to the axis of the discs, means for accurately locating a plurality of connecting wires on the circumference of said discs, and welding means for sequentially welding each of said connecting wires to each of said individual discs including a negative electrode for firmly holding each individual disc in its exact spatial position and a plurality of positive electrodes circumferentially related to said connecting wires.

References Cited in the file of this patent

UNITED STATES PATENTS

| | | |
|---|---|---|
| 2,158,229 | Goldthwaite | May 16, 1939 |
| 2,224,598 | Gilbert | Dec. 10, 1940 |
| 2,293,169 | Platz | Aug. 18, 1942 |
| 2,340,860 | Bragg | Feb. 8, 1944 |
| 2,389,324 | Pedley | Nov. 20, 1945 |
| 2,464,839 | Fairfield | Mar. 22, 1949 |
| 2,559,547 | Reed | July 3, 1951 |
| 2,717,301 | Dixon | Sept. 6, 1955 |